Feb. 17, 1931. W. T. RIMELE 1,792,870
DUAL METER TESTING MACHINE
Filed May 10, 1928 2 Sheets-Sheet 2
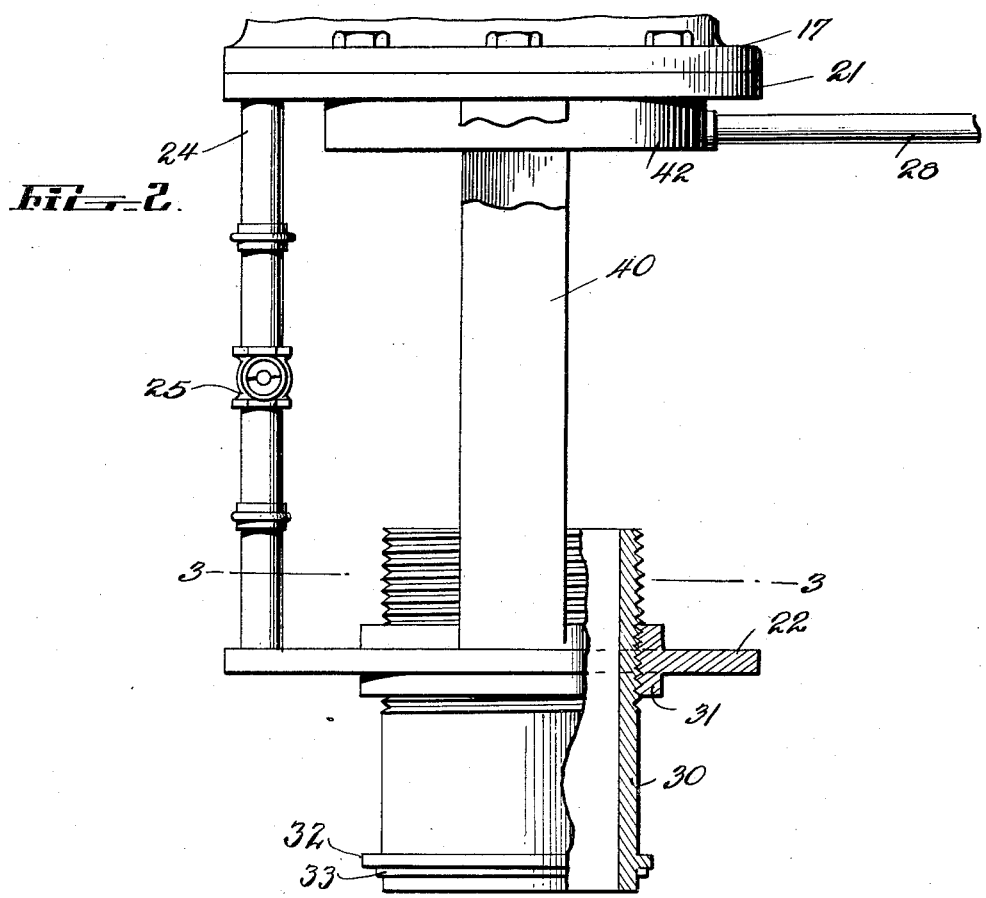
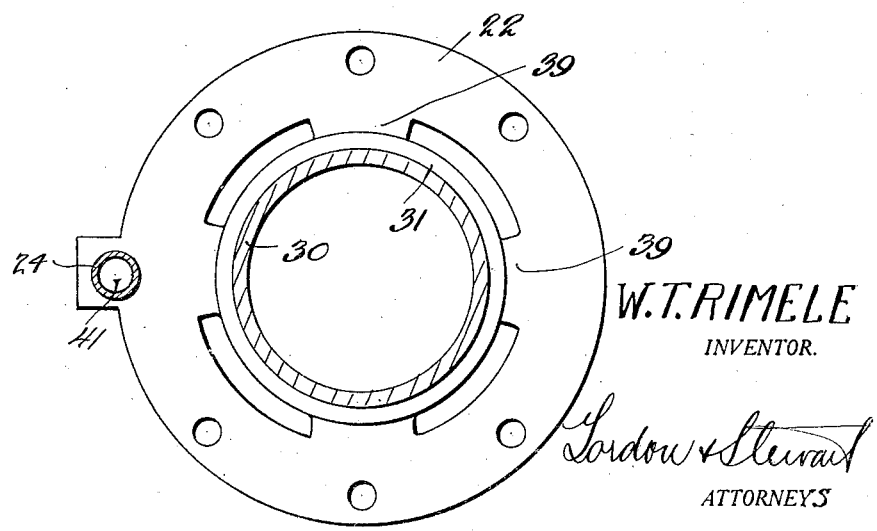
W. T. RIMELE
INVENTOR.
Gordon + Stewart
ATTORNEYS Patented Feb. 17, 1931

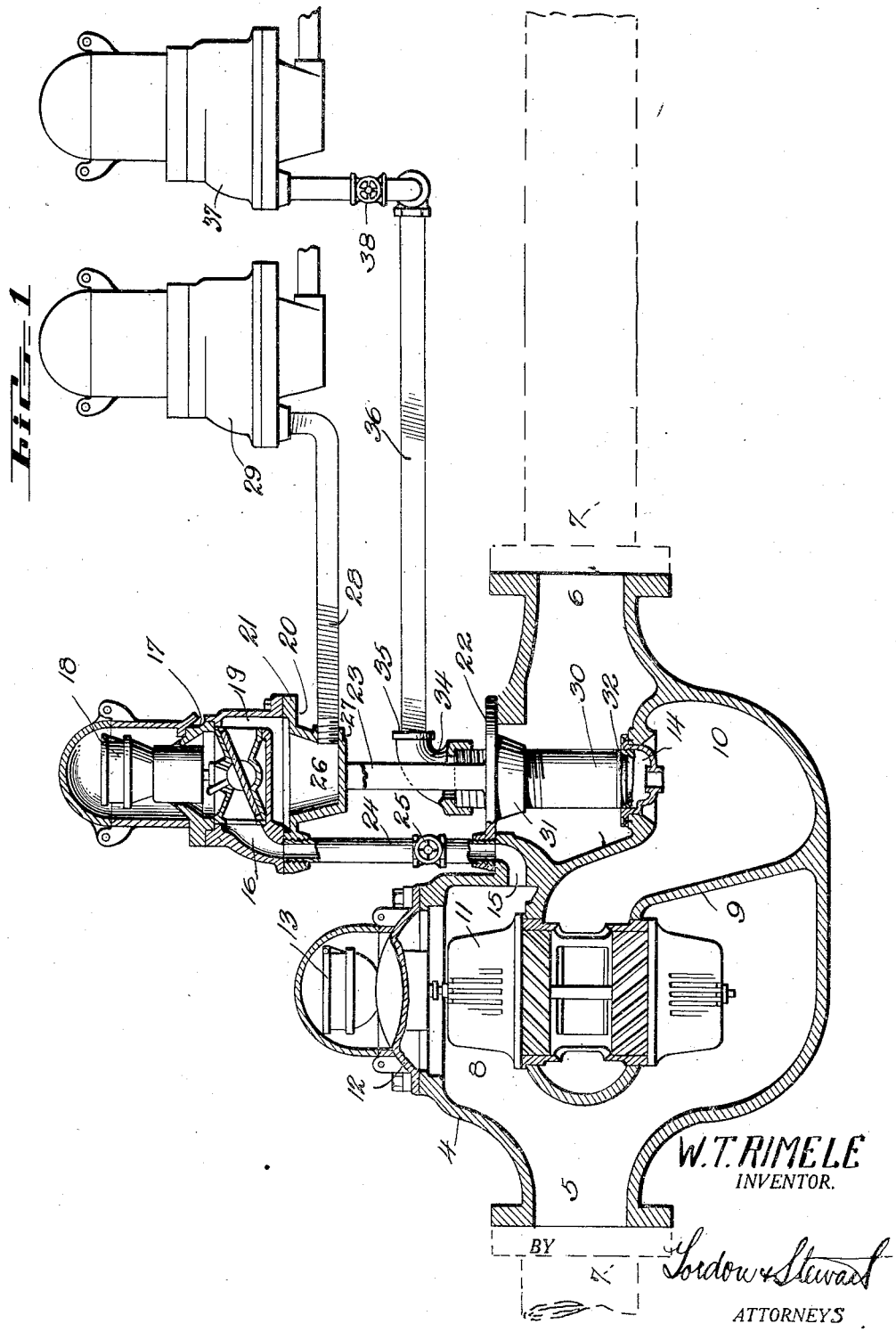

1,792,870

UNITED STATES PATENT OFFICE

WILLIAM T. RIMELE, OF WEST PALM BEACH, FLORIDA

DUAL-METER-TESTING MACHINE

Application filed May 10, 1928. Serial No. 276,771.

This invention relates to that type of fluid meter which has been devised for supplying water or the like in measured quantities at either of two rates of flow. An example of such device is in use to supply water at moderate flow for ordinary purposes and yet to respond to heavy demand without however failing to register accurately the volume of water supplied. Such meters are generally designated as compound meters by reason of the fact that they are equally adapted for both light duty and also heavy duty when the demand is temporarily extraordinary.

Meters of this type are necessarily bulky, of heavy weight and require special equipment and considerable labor in their installation and removal. Necessarily the meters must be tested at intervals dependent upon the particular local conditions existing. To remove such a meter for purposes of making a test of the accuracy of either the light duty meter or the heavy duty meter involves delay, special equipment and the services of several laborers. So far as I am aware it has not been possible previously to test these meters in their permanent position and without removal.

Specifically this invention provides a means for making a test of the accuracy of both the high duty and low duty meters without disconnecting the casing structure itself from the mains. It is also an object of my invention to provide improvements in devices of this type by which the meters may be flushed or blown out incidental to the operation of testing them.

Other objects of my invention will be evident from the following description of the preferred form thereof, as illustrated in the accompanying drawings in which,—

Figure 1 is a side elevation partly in section showing the testing device installed on a compound meter;

Fig. 2 is a side elevation of a modified form and

Fig. 3 is a horizontal section of the line 3—3 of Fig. 2.

For purposes of illustration I have shown my invention as applied to a compound meter of the well known type wherein the normal demand is supplied through a nutating type meter of low capacity and extraordinary demand is met through a turbine meter, both meters being independently connected between the inlet and the outlet or the analogous connections with the mains. As shown in Fig. 1, the casing 4 has an inlet 5 and an outlet 6 which form connections with the mains 7—7. The casing 4 has a chamber 8 leading from the inlet 5. A partition 9 separates the chamber 8 from the succeeding chamber 10 and the partition 9 forms a support for a turbine, denoted generally by the numeral 11.

A cap plate 12 is bolted on the casing 4 above the chamber 8 and carries a registering device 13 of the usual type.

The outflow from the high duty meter 11 passes upward through the valve seat 14 and into the outlet 6.

A by-pass passageway 15 opens upwardly from one side wall of the chamber 8 and is ordinarily in registry with the inlet conduit 16 of a light duty meter of the nutating disk type, marked generally with the numeral 17. This meter has attached thereto a registering device 18 of conventional type. The discharge from the light duty meter 17 is ordinarily passed through the passageway 19 into the outlet 6.

The above details are those ordinarily found in the conventional meters and provide no means for testing one or the other of the metering devices without the entire removal of the whole structure from its customary position. In order, however, to test the accuracy of such devices without removal, I make use of a supplemental discharge receiving member through which the outflow is drawn from both the light-duty meter and the heavy-duty meter and led to test meters either simultaneously or alternately. Such a supplemental discharge receiving member constitutes a diverted path for the outflow from the meters to be tested, leading to the test meters instead of to the usual service outlet 6. By means of such a device the actual service conditions remain undisturbed during testing since the meter to be tested draws its supply from the usual service main 7.

Also during the test the meter remains connected in its usual position. This member may be considered an alternative outlet in place of the service outlet 6 and is placed between the latter and the two meters to be tested.

The supplemental discharge receiving member constitutes means for withdrawing the discharge from one or both of the meters under test and for delivering this discharge to the testing means without disconnecting the meter structure from its usual position in the fluid supply system. The member consists of a frame 20 which comprises an upper plate 21; a base 22 and connecting pillars 23. The base 22 is proportioned to occupy the same position on the casing 4 as is ordinarily held by the meter 17 and the bolts which are used with the meter 17 are also adapted to hold the base 20 in position on the casing 4. On one side of the base 22 and in registry with the passageway 15 is a conduit 24 which is also connected to the passageway 16 through the upper plate 21. A valve 25 serves to close the conduit 24 when desired.

The meter structure 17 is bolted in place on the upper ring in the manner shown in Fig. 1. The ring 21 has a central outlet 26 to receive the discharge from the passageway 19 of meter 17. An elbow 27 leads from the member 26 and delivers to a pipe 28 which is preferably in the form of a flexible hose. The opposite end of the hose 28 is connected to a test meter 29 which may be suitably supported adjacent the metering device or upon the surface of the ground nearby as may be most convenient.

The base 22 carries a central collar 31 which is internally screw threaded to adjustably receive the threaded sleeve 30. This sleeve 30 has a machined end 32 adapted to register with the valve seat 14. The end 32 is reduced to receive a gasket 33 for engagement with the valve seat 14. The gasket 33 is brought down tightly against the valve seat 14 by a partial rotation of the sleeve 30.

The upper end of the sleeve 30 has an elbow 34 with a bayonet coupling 35 through which the elbow 34 may be removably connected with a flexible hose 36 or similar pipe. The hose 36 leads to a second suitably proportioned metering device which may consist of one or more test meters. This metering device 37 may be suitably located either within the compartment holding the casing 4 or upon the surface of the ground nearby. Between the metering device 37 and the hose 36 there is located a cut-off valve 38. If desired the metering device 37 and the flexible hose 36 may be disconnected from the elbow 34 and the latter closed by means of a cap.

In Fig. 2 there is illustrated a further modification of the device as adapted to test meters of larger capacity. In this form the base 22 is of the same general form as that already described except that it is connected to the collar 31 by means of four webs 39. The collar 31 carries the screw-threaded sleeve 30 which in turn engages with the valve seat 14 as shown in Fig. 1. The upper end of sleeve 30 carries an elbow in the manner already described for connection with the testing device for the larger meter.

The upper ring 21 is connected to the base 22 by means of two opposite pillars 40. A conduit 24 having valve 25 extends between the ring 21 and the base 22, connecting through the opening 41 of the latter with the passageway 15 in the casing 4. The ring 21 supports the small meter 17 which is to be tested. The discharge from the latter is received in the pan 42 forming part of the ring 21. The flexible hose 28 connects the pan 42 with the testing device 29 already described.

By means of the device above described it will be readily apparent that the service meters may be tested independently of each other under actual service conditions at their usual location. In this way any error which might otherwise creep in when the test is carried out under pressure conditions differing from actual service, will be entirely avoided. Again it is important that in a device of this type the testing be carried out independently from any T-connection or other means that is sometimes provided at the outlet end of the meter, but which is open to error in the event that undesired leakage exists at the house valve.

The operation of this device will be readily understood from the above description. The test is carried out by lifting the small meter 17 from its position on the casting 4 and substituting the base 22 of the device. The small meter 17 is then mounted upon the testing device. With the elbow 34 capped or the passage through valve 14 otherwise stopped, the water may be drawn through pipe 24, the service meter 17 and the test meter 29. A comparison between the test meter and the service meter can then be carried out with great accuracy.

With the valve 25 closed and the elbow 34 connected to the second testing device 37 the flow of water through the turbine meter 11 can be accurately measured. By reason of the openings between the webs 39 in the base 22 the operator can be assured by inspection that no loss occurs through leakage through the valve 14.

While one preferred form of my invention has been described and illustrated above it will be apparent that numerous changes in minor details and proportions may be carried out within the scope of the invention as defined in the following claims.

What I claim is:

1. The combination with a compound meter device comprising a casing having an inlet and an outlet, a heavy-duty meter and a light-duty meter forming independent connections between the inlet and outlet, of a supplemental discharge receiving member inserted between said meters and the outlet, and testing means connected to said discharge receiving member.

2. The combination with a compound meter device comprising a casing having an inlet and an outlet, a heavy-duty meter and a light-duty meter forming independent connections between the inlet and outlet, of a supplemental discharge receiving member inserted between said meters and the outlet and a plurality of meter testing means connected to said discharge receiving member.

3. The combination with a compound meter device comprising a casing having an inlet and an outlet, a heavy-duty meter and a light-duty meter forming independent connections between the inlet and outlet, of a frame mounted on the casing and adapted to support the said light-duty meter, a valved conduit through the frame from the casing to the said light-duty meter, and means to receive and measure the discharge from said light-duty meter.

4. The combination with a compound meter device comprising a casing having an inlet and an outlet, a heavy-duty meter and a light-duty meter forming independent connections between the inlet and outlet, of a frame mounted on the casing and adapted to support the said light-duty meter, a sleeve carried by the frame to receive the flow from the heavy-duty meter and means connected to said sleeve for measuring said flow.

5. The combination with a compound meter device comprising a casing having an inlet and an outlet, a heavy-duty meter and a light-duty meter forming independent connections between the inlet and outlet, of a frame mounted on the casing and adapted to support the said light-duty meter, a valved conduit through the frame from the casing to the said light-duty meter, means to receive and measure the discharge from said light-duty meter, a sleeve carried by the frame to receive the flow from the heavy-duty meter and means connected to said sleeve for measuring said flow.

6. The combination with a compound meter device comprising a casing having an inlet and an outlet, a heavy-duty meter and a light-duty meter forming independent connections between the inlet and outlet, of a frame mounted on the casing and adapted to support the said light-duty meter, a valved conduit through the frame from the casing to the said light-duty meter, means to receive and measure the discharge from said light-duty meter, a sleeve carried by the frame to receive the flow from the heavy-duty meter, means connected to said sleeve for measuring said flow, and a valve between said last named means and the sleeve.

7. A mounting for supporting a meter under test in operative relationship to its normal casing, comprising a base, a plate attached to hold said meter, means for supporting the plate above the base, a conduit extending between and through the plate and base, and a member providing an outlet from the said plate.

8. A mounting for supporting a meter under test in operative relationship to its normal casing, comprising a base, a plate adapted to hold said meter, means for supporting the plate above the base, a conduit extending between and through the plate and base, a seat on the said plate for receiving a meter with its inlet connected with said conduit and a member providing an outlet from the said plate.

9. A mounting for supporting a meter under test in operative relationship to its normal casing, comprising a base, a plate adapted to hold said meter, means for supporting the plate above the base, a collar in the base, and a sleeve adjustable longitudinally of the collar.

In testimony whereof, I affix my signature.

WILLIAM T. RIMELE.